United States Patent Office 3,496,963
Patented Feb. 24, 1970

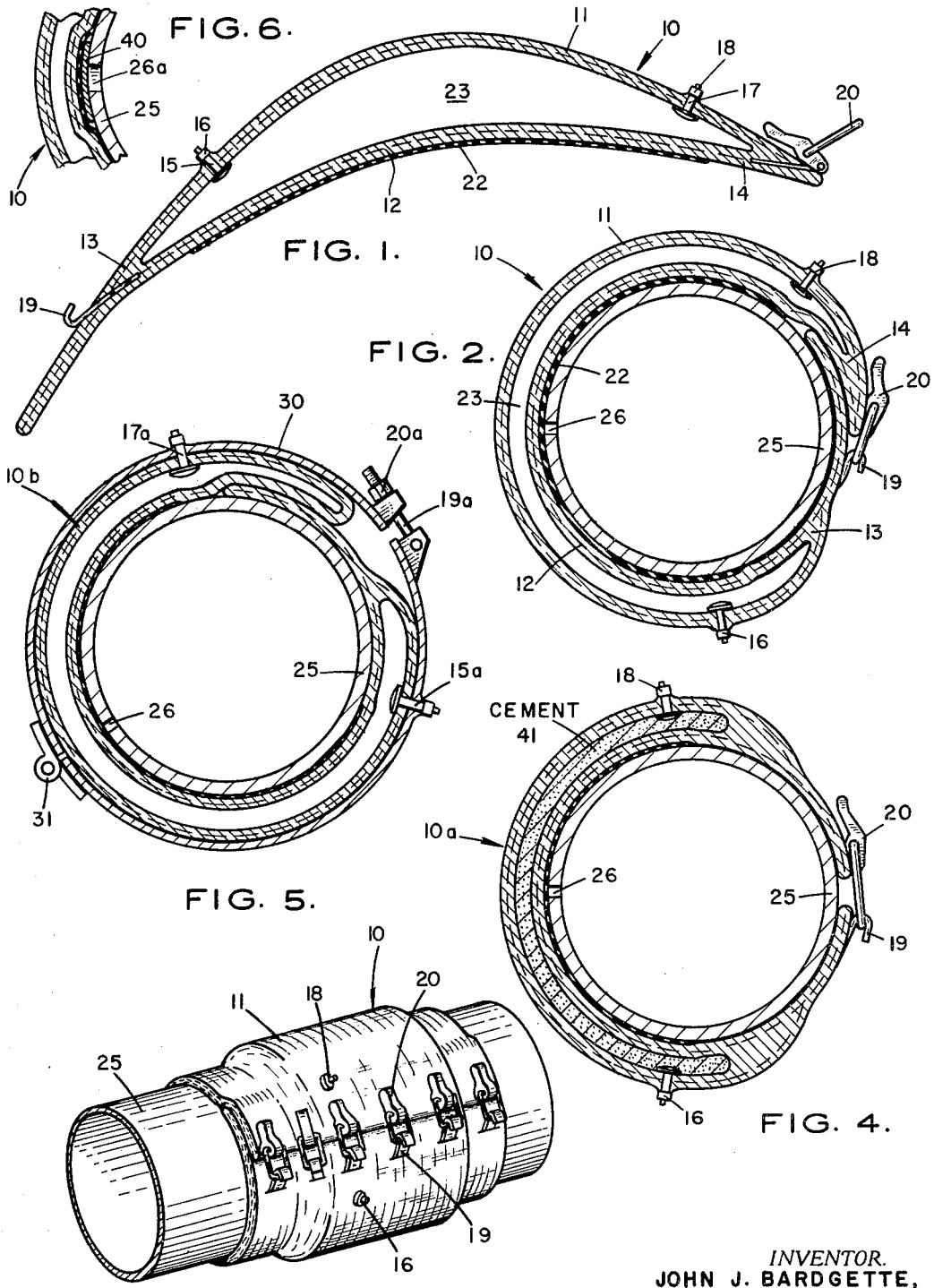

3,496,963
PRESSURIZED REPAIR CLAMP FOR PIPELINE
John J. Bardgette, Orleans Parish, and Luther S. Moody, Jefferson Parish, La., assignors to Esso Production Research Company
Filed Aug. 12, 1968, Ser. No. 751,822
Int. Cl. F16l 55/16
U.S. Cl. 138—99                 16 Claims

ABSTRACT OF THE DISCLOSURE

A clamp for repairing leaks in pipelines. A bladder capable of being wrapped around a pipeline over a hole in the pipeline wall and then distended with fluid pressure to cause a tight contact between the outer surface of the bladder and the outer surface of the pipeline to prevent flow of fluid from within the pipeline through the hole in the pipeline wall. One end of the bladder may overlap the other end thereof when wrapped about the pipeline. A gaseous or liquid fluid is used to distend the bladder. For permanent installations, the fluid used to distend the bladder may be a chemical or thermo setting material.

BACKGROUND OF THE INVENTION

Field of the invention

The present invention concerns sealing or repair of leaks in pipelines and particularly leaks in deeply submerged offshore pipelines.

Summary of the invention

In accordance with the teachings of the invention, the apparatus for sealing leaks in pipelines comprises a bladder which can be wrapped around a pipeline over a hole in the wall of the pipeline, cinched tightly over the hole, and distended with fluid pressure to cause tight contact between the outer surface of the bladder and the outer surface of the pipeline to prevent flow of fluid from within the pipeline to the exterior thereof through the hole in the pipeline wall. When wrapped around a pipeline, the bladder preferably overlaps itself in the same manner the inflatable element of a physician's sphygmomanometer overlaps itself. The bladder is equipped with quick latch mechanisms for cinching the bladder around the pipe. These latch mechanisms may be similar to truck latches or load binders. The walls of the bladder are constructed to hold the required distending pressure. The bladder is also equipped with inlet and outlet connections so that the interior of the bladder can be sealed with any type of desired fluid and to permit displacement of one fluid by another fluid. Such inlet and outlet connections are equipped with valves so that pressure can be applied and held within the bladder. The outer surface of the bladder is preferably made of rubbery or elastic material in order to facilitate the formation of an effective seal between the bladder and the pipe surface. The bladder and pipeline may be encased with a latch-around sleeve.

A primary object of the present invention is to provide an improved apparatus for closing off leaks in pipelines.

The above object and other objects and advantages of the invention will be apparent from a more detailed description thereof when taken with the drawings wherein:

FIG. 1 is a cross-sectional view of a bladder-type clamp for use in repairing leaks in pipelines preparatory to installation on a pipeline;

FIG. 2 is a cross-sectional view of the bladder illustrated in FIG. 1 clamped on a pipeline;

FIG. 3 is an isometric view of the bladder illustrated in FIG. 1 clamped on a pipeline;

FIG. 4 is a cross-sectional view of a modification of the bladder of FIG. 1 clamped on a pipeline;

FIG. 5 is a cross-sectional view of still another modification of the bladder of FIG. 1 showing the bladder clamped on a pipeline and a hinged pipe sleeve arranged around the bladder; and FIG. 6 illustrates another modification of the present invention in which a plate is arranged on a hole in a pipeline between the outer surfaces of the bladder and the pipeline.

DESCRIPTION OF THE PREFERRED EMBODIMENTS

Referring to FIG. 1, the bladder 10 includes a hollow, curved member having an outer wall 11 and an inner wall 12 joined at each end 13 and 14 to form thereby a chamber 23. End 13 is provided with a fluid inlet-outlet connection 15 having a valve 16 arranged thereon. End 14 is also provided with a fluid inlet-outlet connection 17 having a valve 18 arranged thereon. The outer surface 22 of wall 12 is provided with an elastic material such as rubber to facilitate forming an effective seal between the bladder and the outer surface of the pipeline about which the bladder is wrapped. Ends 13 and 14 are provided with latch members 19 and 20, respectively. These quick latch mechanisms are similar to truck latches or load binders.

As seen in FIG. 2, bladder 10 is wrapped about a pipeline 25 and covers a hole 26 in the pipeline. End 14 overlaps end 13 and the bladder is cinched tight by latch members 19, 20. Fluid is introduced into the space or chamber 23 between walls 11 and 12 through either connection 15 or 17 to seal off hole 26.

As illustrated in FIG. 3, bladder 10 is constructed in a generally rectangular shape similar to an air mattress and as shown in FIG. 1, is preferably initially formed in a curved position similar to a tire inner tube which has been cut in two and the ends sealed. The walls of the bladder are constructed to hold the required distending pressure (similar to pressure hose construction). The valved inlet-outlet connections 15 and 17 permit filling the bladder with any type of desired fluid and also permit displacement of one fluid within the bladder by another fluid.

Referring to FIGS. 1–3, the general method of installing and using the distensible wrap-around repair bladder is as follows: A bell-hole is excavated (by divers when the pipeline is submerged) surrounding a pipeline 25 at the location of a leak 26. The outer surface of the pipeline at the location of the leak is cleaned to relatively clean steel. The size of hole 26 is then determined. If the hole is small and the distended bladder won't protrude through the pipe, bladder 10 is wrapped around pipeline 25 at the location of hole 26 (by divers when the pipeline is submerged) and the bladder is cinched tight by means of latches 19, 20. The bladder is then filled with a desired fluid through inlet-outlet connection 15 (or 17) and pressure is increased until it exceeds the operating pressure within the pipeline and effects a seal. Valve 16 (or 18) is then closed to retain pressure within the bladder.

As illustrated in FIG. 6, after the size of the hole is determined, if the hole is large enough to permit distended bladder 10 to protrude through the pipe 25, the hole 26a is first covered with a curved steel plate or pipe segment 40 and secured to prevent slipping.

If a temporary seal of a pipeline leak is desired, the distensible fluid may be air, natural gas, water or similar fluids. Pressure applied on these fluids can readily be bled off when the bladder is to be removed. However, if the bladder is to be permanently installed, as illustrated in FIG. 4, the distensible fluid may be a chemical or thermo setting material 41, such as cement slurry or epoxy grout. Such material would prevent accidental loss of sealing pressure.

FIG. 4 also illustrates a wrap-around bladder 10a in which the ends thereof do not overlap. Bladder 10a is installed and used in the same manner that bladder 10 is installed and used in accordance with the above description.

If the required distensible pressure is greater than the bladder 10 can withstand, the bladder and the pipeline may be encased with a latch-around pipe sleeve 30, as illustrated in FIG. 5. In that figure, a split pipe sleeve 30, provided with a hinge 31 on one side thereof and a quick latch mechanism 19a, 20a on the other side thereof, surrounds bladder 10b. Suitable openings in pipe sleeve 30 accommodate valved connections 15a and 17a in bladder 10b.

After wrapping bladder 10b about pipeline 25 and covering leak 26, latch members 19a, 20a are latched together. The bladder is then pressured up within the annulus between pipeline 25 and the pipe sleeve 30 through connection 15a or 17a to seal hole 26. The bladder-pipe sleeve type clamp is preferably manufactured into a single unit for installation, as illustrated in FIG. 5; however, the pipe sleeve may be made as a separate unit to be placed over the bladder after it is installed on the pipe sleeve.

Before lowering the bladder for underwater installation, it may be inflated with air or gas to increase buoyancy and thus decrease apparent weight to be handled by divers while maneuvering the bladder into position.

Other changes and modifications may be made in the specific embodiment of the invention shown and described herein without departing from the scope of the invention.

Having fully described the objects, advantages, apparatus and operation of our invention, we claim:

1. A clamp for repairing leaks in pipelines comprising: a fluid-distensible bladder adapted to be wrapped around said pipeline to cover a hole in said pipeline causing said leak, said bladder being provided with means adapted to tighten said bladder about said pipeline and means adapted to permit introduction of fluid into said bladder to distend said bladder with fluid pressure to cause tight contact between the outer surface of said bladder and the outer surface of said pipeline.

2. A clamp as recited in claim 1 including an elastic outer surface of said bladder covering said hole in said pipeline.

3. A clamp as recited in claim 2 in which said means adapted to permit introduction of fluid includes a first valved connector also adapted to permit egress of fluid from said bladder.

4. A clamp as recited in claim 3 including a second valved connector adapted to permit introduction of fluid into and egress of fluid from said bladder spaced from said first valved connector.

5. A clamp as recited in claim 2 in which said fluid introduced into said bladder is adapted to set and harden and permanently seal said leak in said pipeline.

6. A clamp as recited in claim 2 including a supporting sleeve encasing said bladder.

7. A clamp as recited in claim 2 in which one end of said bladder overlaps the other end thereof when said bladder is wrapped around said pipeline.

8. A clamp as recited in claim 7 in which said means adapted to permit introduction of fluid includes a first valved connector also adapted to permit egress of fluid from said bladder.

9. A clamp as recited in claim 8 including a second valved connector adapted to permit introduction of fluid into and egress of fluid from said bladder spaced from said first valved connector.

10. A clamp as recited in claim 7 in which said fluid introduced into said bladder is adapted to set and harden and permanently seal said leak in said pipeline.

11. A clamp as recited in claim 7 including a supporting sleeve encasing said bladder.

12. A clamp for repairing leaks in pipelines comprising:
   a fluid-distensible bladder wrapped around said pipeline to cover a hole in said pipeline causing said leak;
   means including a plate member positioned over said hole in said pipeline between the outer surface of said bladder and the outer surface of said pipeline;
   means adapted to tighten said bladder about said pipeline; and
   means adapted to permit introduction of fluid into said bladder to distend said bladder with fluid pressure to cause tight contact between the inner surface of said plate member and said pipeline.

13. A clamp as recited in claim 12 including an elastic outer surface of said bladder covering said plate member positioned on said hole in said pipeline.

14. A clamp as recited in claim 13 in which one end of said bladder overlaps the other end thereof.

15. A clamp as recited in claim 14 including a supporting sleeve encasing said bladder.

16. A clamp as recited in claim 15 in which said fluid introduced into said bladder is adapted to set and harden and seal permanently said leak in said pipeline.

References Cited

UNITED STATES PATENTS

| | | | |
|---|---|---|---|
| 782,290 | 2/1905 | Tompkins | 138—98 |
| 1,800,085 | 4/1931 | Kroeger et al. | 138—97 X |

LAVERNE D. GEIGER, Primary Examiner

R. J. SHER, Assistant Examiner